(12) United States Patent
Schnitzler et al.

(10) Patent No.: US 11,202,257 B2
(45) Date of Patent: Dec. 14, 2021

(54) SELECTIVELY CHANGING ACTIVATION STATUS OF A WIRELESS ACCESS POINT

(71) Applicant: InterDigital CE Patent Holdings, SAS, Paris (FR)

(72) Inventors: Francois Schnitzler, Cesson-Sevigne (FR); Adithya Vadapalli, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 16/645,485

(22) PCT Filed: Sep. 7, 2018

(86) PCT No.: PCT/EP2018/074154
§ 371 (c)(1),
(2) Date: Mar. 8, 2020

(87) PCT Pub. No.: WO2019/048619
PCT Pub. Date: Mar. 14, 2019

(65) Prior Publication Data
US 2020/0288391 A1 Sep. 10, 2020

(30) Foreign Application Priority Data
Sep. 8, 2017 (EP) .................................... 17306160

(51) Int. Cl.
*H04W 52/02* (2009.01)
*H04W 16/26* (2009.01)
(Continued)

(52) U.S. Cl.
CPC ...... *H04W 52/0206* (2013.01); *H04B 17/309* (2015.01); *H04W 16/26* (2013.01);
(Continued)

(58) Field of Classification Search
CPC ............. H04W 16/26; H04W 52/0206; H04W 52/0245; H04W 84/12; H04W 88/08; H04B 17/309
(Continued)

(56) References Cited

U.S. PATENT DOCUMENTS

| 8,660,547 B2 | 2/2014 | Marin |
| 2008/0219214 A1 | 9/2008 | Chen et al. |

(Continued)

FOREIGN PATENT DOCUMENTS

| CN | 106900029 A | 6/2017 |
| WO | WO 2017116583 A1 | 7/2017 |

OTHER PUBLICATIONS

Hashim et al., "Power Adjustment in Dense Deployment Network: An Empirical Study", 2014 IEEE Region 10 Conference (TENCON 2014), Bangkok, Thailand, Oct. 22, 2014, 5 pages.
(Continued)

*Primary Examiner* — Gbemileke J Onamuti
(74) *Attorney, Agent, or Firm* — Andrew W. Spicer

(57) ABSTRACT

A method for selectively changing an activation status of an access point in a wireless system is described. The wireless system includes a plurality of wireless access points having at least one device for extending wireless signal coverage coupled thereto and a controller. The controller is configured to change the activation status of the at least one extender coupled to the one or more of the plurality of wireless access points based on connection quality of a user device to the wireless system.

10 Claims, 5 Drawing Sheets

(51) Int. Cl.
*H04B 17/309* (2015.01)
*H04W 84/12* (2009.01)
*H04W 88/08* (2009.01)

(52) U.S. Cl.
CPC ........ *H04W 52/0245* (2013.01); *H04W 84/12* (2013.01); *H04W 88/08* (2013.01)

(58) Field of Classification Search
USPC .......................................................... 370/252
See application file for complete search history.

(56) References Cited

U.S. PATENT DOCUMENTS

2015/0113899 A1    4/2015  Gray et al.
2015/0138991 A1*  5/2015  Timariu ................ H04W 88/04
370/241

OTHER PUBLICATIONS

Sharma et al., "A Transfer Learning Framework for Energy Efficient Wi-Fi Networks and Performance Analysis Using Real Data", 2016 IEEE International Conference on Advanced Networks and Telecommunications Systems (ANTS), Bangalore, India, Nov. 6, 2016, 6 pages.

* cited by examiner

SELECTIVELY CHANGING ACTIVATION STATUS OF A WIRELESS ACCESS POINT

This application claims the benefit, under 35 U.S.C. § 365 of International Application PCT/EP2018/074154, filed Sep. 7, 2018, which was published in accordance with PCT Article 21(2) on Mar. 14, 2019, in English, and which claims the benefit of European Patent Application No. 17306160.7, filed Sep. 8, 2017.

FIELD

The disclosure pertains to wireless communication networks, in particular to managing network devices providing access to wireless communication, including wireless access points.

BACKGROUND

This section is intended to introduce the reader to various aspects of art, which may be related to embodiments that are described below. This discussion is believed to be helpful in providing the reader with background information to facilitate a better understanding of the various aspects of the present disclosure. Accordingly, it should be understood, that these statements are to be read in this light.

Throughout this specification the terms wireless LAN, WLAN, Wi-Fi™ and IEEE 802.11 are used interchangeably unless otherwise noted. The term wireless access point, also referred to by its abbreviation AP, refers to a device that provides wireless access to a network, e.g., the Internet, a local area network (LAN), or a wide area network (WAN). An AP may or may not include functionalities of a router or a gateway, and may be an integrated part of such devices. SSID is an abbreviation for Service Set Identifier and refers, inter alia, to the name of a wireless network by which it can be distinguished from other wireless networks. A wireless extender, is a device that extends the wireless signal coverage of the wireless network provided by an AP within a given zone or distance from the AP, using the same SSID. An extender may operate on the same channel or on a different channel than the AP, that its reach extends. An extender may be connected with the AP via a wired or wireless link. In the latter case, the extender is called a "repeater". A device implementing an AP may function as an extender. The term mobile station, or MS, refers to a mobile device that can be wirelessly connected to an AP for accessing the network. The term association refers to the process of establishing a connection between a MS and a particular AP, and the term disassociation refers to the process of terminating the connection between a MS and a particular AP. Before a MS can associate with an AP, it typically must terminate any previous connection with a different AP (disassociate), if applicable.

Mobility and roaming is a key issue in wireless networks, and users expect their tablet computers, laptops, etc., to be connected to a network at any time. Like with a mobile phone, users want to stay connected to the wireless networks while moving around. In the case of Wi-Fi™ networks and in IEEE 802.11 terminology, this means keeping the wireless interface of the mobile station associated with an access point, this mode of operation being referred to as infrastructure mode.

In telecommunication networks, the association process is controlled by the network itself. In WiFi networks, however, decisions on associating with or disassociating from an AP are entirely left to the mobile station. Hence, a mobile station must scan potential channels to discover new access points and request association. Moreover, the interconnection network must react to these successive associations, by keeping bridging and routing tables up to date, or by allocating new IP addresses, for example. These procedures cause variability in the delays during mobility, degrading significantly the quality of service for constrained traffic, like for example, voice over IP. Furthermore, since the mobility decisions are taken in the station, it is impossible to provide efficient resource management in the network of access points, for load balancing or interference mitigation.

Some wireless networks, notably WiFi networks, use repeaters for providing proper signal coverage in a larger area that cannot be covered by a single AP. However, active repeaters are typically always on and consuming energy. The only solution to save energy is to manually switch off the active repeaters. As such, it is generally desirable to reduce the power consumption of such devices when they are not used.

SUMMARY

The proposed method and apparatus concern dynamically deactivating access points including extenders/repeaters in a wireless system. It will be appreciated that the method and apparatus is not limited to any specific type of system and may be applied to any wireless communication system, such as for example a wireless local area network (WLAN) or a WiFi network.

According to a first aspect of the disclosure, a method is disclosed for determining, a connection quality for a user device to one or more wireless access points having at least one device for extending wireless signal coverage coupled thereto; and then changing the activation status of the at least one device for extending wireless signal coverage coupled to the one or more wireless access points based on the determined connection quality for the user device.

In an embodiment, the connection quality of the user device is determined based on one or more of signal to noise ratio, number of packets correctly transmitted, an inverse of a percentage of retransmissions, whether the user device could connect to one of the plurality of access points and up or downstream debit.

In an embodiment, the connection quality of the user device is determined as a function of:

$$o_t(A) = \max_{A \subseteq S} \max_{a \in A} Q_t(d, a) - C|A|$$

wherein $Q_t(d,a)$ is a connection strength and $C|A|$ is an energy consumption for the at least one device for extending wireless signal coverage.

In an embodiment, the plurality of access points are access points of one of a WLAN or a WiFi network.

According to a second aspect of the disclosure, a controller is provided having one or more processors configured to change the activation status of at least one device for extending wireless signal coverage coupled to one or more wireless access points based on connection quality of a user device.

In an embodiment, the connection quality of the user device is determined based on one or more of signal to noise ratio, number of packets correctly transmitted, an inverse of a percentage of retransmissions, whether the user device could connect to one of the plurality of access points and up or downstream debit.

In an embodiment, wherein the connection quality of the user device is determined as a function of:

$$o_t(A) = \max_{A \subset S} \max_{a \in A} Q_t(d, a) - C|A|$$

wherein $Q_t(d,a)$ is a connection strength and $C|A|$ is an energy consumption for the at least one device for extending wireless signal coverage.

In an embodiment, a system is provided including a plurality of wireless access points having at least one device for extending wireless signal coverage coupled thereto; and a controller configured to change the activation status of the at least one device for extending wireless signal coverage coupled to one or more wireless access points based on connection quality of a user device.

In an embodiment, the plurality of access points are access points of one of a WLAN or a WiFi network.

In an embodiment, a user device is provided for connecting to at least one of the plurality of access points.

Some processes implemented by elements of the disclosure may be computer implemented. Accordingly, such elements may take the form of an entirely hardware embodiment, an entirely software embodiment (including firmware, resident software, microcode, etc.) or an embodiment combining software and hardware aspects that may all generally be referred to herein as "circuit", "module" or "system". Furthermore, such elements may take the form of a computer program product embodied in any tangible medium of expression having computer usable program code embodied in the medium.

Since elements of the present disclosure can be implemented in software, the present disclosure can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an optical signal, an acoustic signal, a magnetic signal or an electromagnetic signal, e.g., a microwave or RF signal.

BRIEF DESCRIPTION OF THE DRAWINGS

Embodiments of the disclosure will now be described, by way of example only, and with reference to the following drawings in which.

It should be understood that the drawings are for purposes of illustrating the concepts of the disclosure and is not necessarily the only possible configuration for illustrating the disclosure.

DETAILED DESCRIPTION

Figure 1:
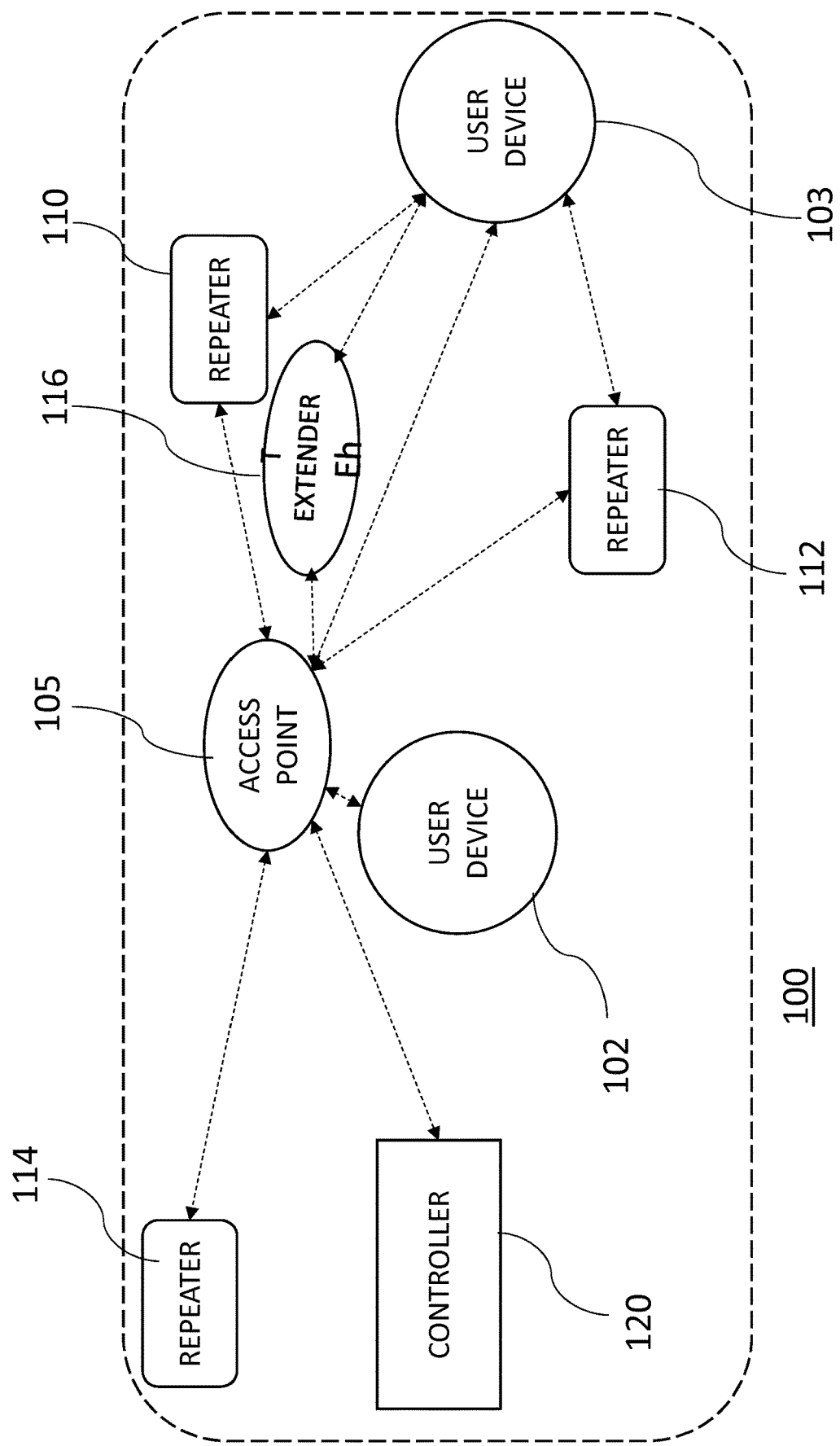
FIG. 1 illustrates a simplified block diagram of an exemplary wireless system in accordance with an embodiment of the present disclosure.

FIG. 1 illustrates an exemplary wireless system 100 in accordance with an embodiment of the present disclosure.

Wireless system 100 may be, for example, a home network or a public network. Wireless system includes one or more user devices 102, 103 intending to utilize wireless system 100. Wireless system 100 further includes one or more access points 105 or extender/repeaters 110, 112, 114, 116 and a controller 120 configured to (change the status of) deactivate the one or more access points 105 or extender/repeaters 110, 112, 114, 116. The controller 120 could, for example, be implemented in a wireless gateway.

The controller is configured to change the activation status of the one or more access point 105 or extenders/repeaters 110, 112, 114, 116 based on a determined connection quality for the one or more user devices 102, 103. Such an arrangement advantageously conserves power, since components may be turned-off when not needed for wireless communication.

For example, with reference to FIG. 1, user device 103 may have a better determined connection quality to one of repeaters 110, 112, or extender 116, rather than repeater 114. In such an instance, controller 120 may deactivate (change the activation status of) repeater 114 to conserve power.

Alternatively, user device 102 may have a better determined connection quality directly to access point 105, rather than via extender/repeaters 110, 112, 114, 116. In such an instance controller 120 may change the activation status of one or more of extender/repeaters 110, 112, 114, 116 to conserve power.

Figure 2:
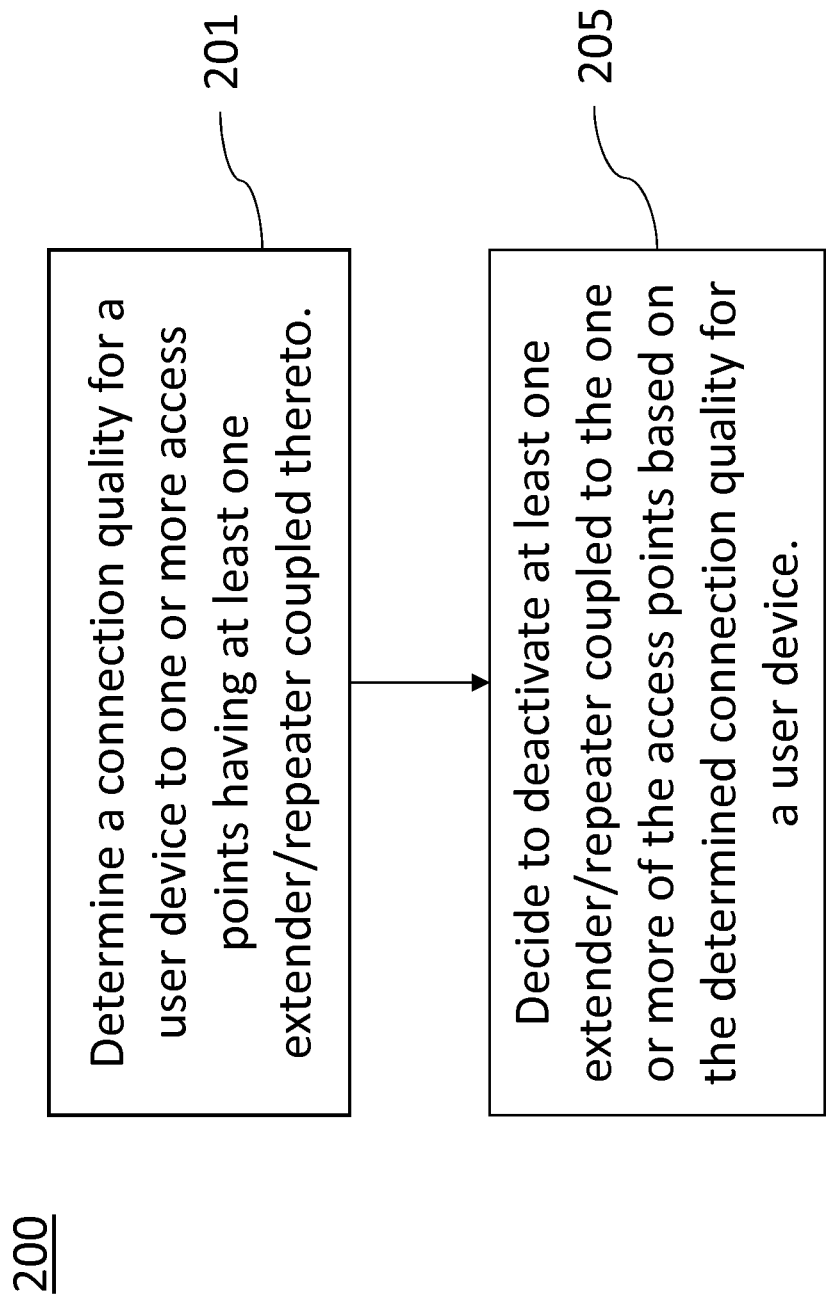
FIG. 2 illustrates a flowchart of an exemplary method in accordance with one embodiment of the disclosure.

FIG. 2 illustrates a flowchart of an exemplary method 200 in accordance with another aspect of the disclosure. In step 201, a connection quality for a user device 102, 103 to one or more access points 105 having at least one extender/repeater 110, 112, 114, 116 coupled thereto is determined.

At least one extender/repeater 110, 112, 114, 116 coupled to the one or more of the access points is deactivated based on the determined connection quality for a user device 102, 103, as depicted in step 205 of FIG. 2.

An exemplary function for determining the connection quality for one or more user devices 102, 103 may typically contain two terms. The first one would measure the quality of the connection and the second one would penalize for energy consumption. As an example, consider the following expression:

$$o_t(A) = \max_{A \subset S} \max_{a \in A} Q_t(d, a) - C|A|$$

wherein $Q_t(d,a)$ measures the quality of the connection for the plurality of access points 105 or at least one extender/repeater 110, 112, 114, 116 and $C|A|$ is an energy consumption for each access point 105 or at least one extender/repeater 110, 112, 114, 116.

Such an exemplary function, should preferably find the best subset A of all access points (S) 105 and/or extender/repeaters 110, 112, 114, 116 to activate:

for each user device d in the set of user devices (D) 102, 103 accessing the system, and identify the connection quality $Q_t(d,a)$ for each access point 105 and/or extender/repeater 110, 112, 114, 116 in the system;

while also accounting for the energy cost C of each access point 105 and/or extender/repeater 110, 112, 114, 116 when operational.

In the above function, the constant C can be adapted to increase or reduce the importance of energy saving with respect to connection quality. When there is more than one user device the above function may be modified as:

$$o_t(A) = \max_{A \subset S} \Sigma_{d \in D} \max_{a \in A} Q_t(d, a) - C|A|.$$

Figure 3:
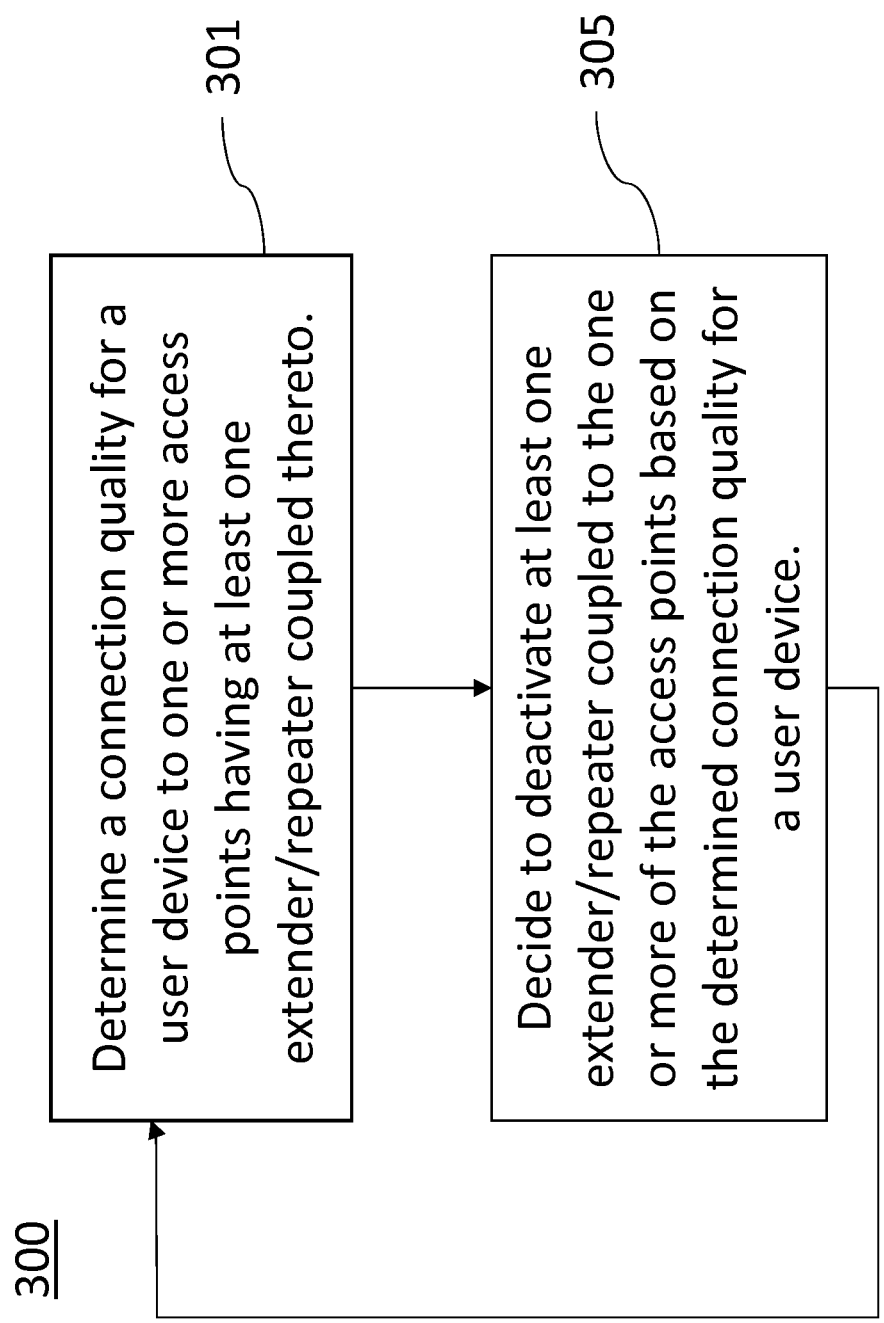
FIG. 3 illustrates a flowchart of an exemplary method in accordance with another embodiment of the disclosure.

Many other functions are possible. The connection quality $Q_t(d,a)$ is expected to vary over time as people move in, for example, the house, neighbors use their WiFi, microwaves are switched on, etc. Therefore, the controller will typically try to optimize the expectation of this function iteratively, as illustrated in FIG. 3. To measure this variation, the function may be estimated during time windows (denoted by t) and considered constant during that time windows.

FIG. 3 illustrates an exemplary method 300 in accordance with another aspect of the disclosure. In step 301, a connection quality for a user device 102, 103 to one or more access points 105 having at least one extender/repeater 110, 112, 114, 116 coupled thereto is determined.

At least one extender/repeater 110, 112, 114, 116 coupled to the one or more of the access points is deactivated based on the determined connection quality for a user device 102, 103, as depicted in step 305 of FIG. 3.

The connection quality $Q_t(d,a)$ can be any measure associated to quality, for example up or downstream debit, signal over noise ratio, number of packets correctly transmitted, the inverse of the percentage of retransmissions, whether the device could connect or not, etc.

Figure 4:
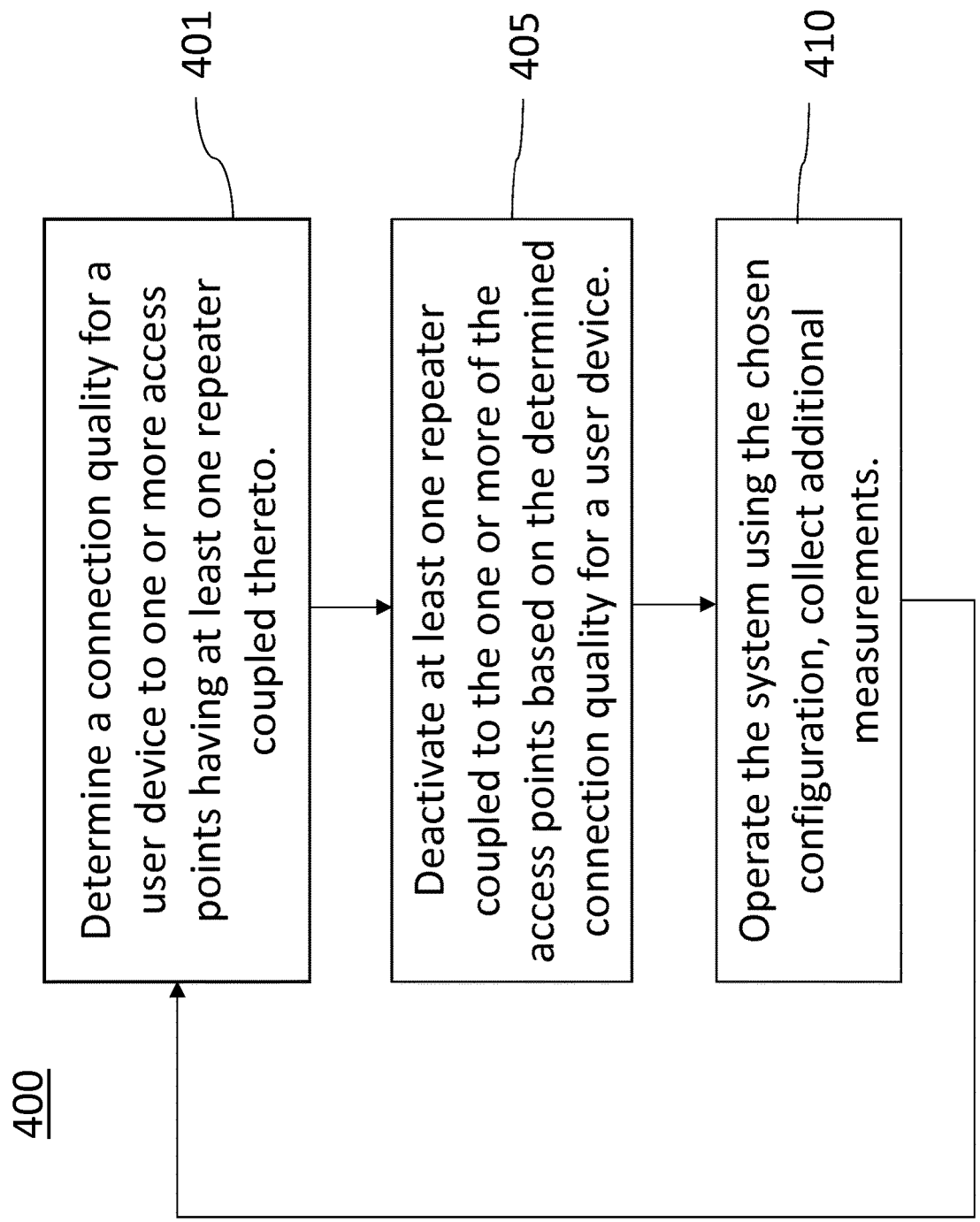
FIG. 4 illustrates a flowchart of an exemplary method in accordance with another embodiment of the disclosure.
Figure 5:
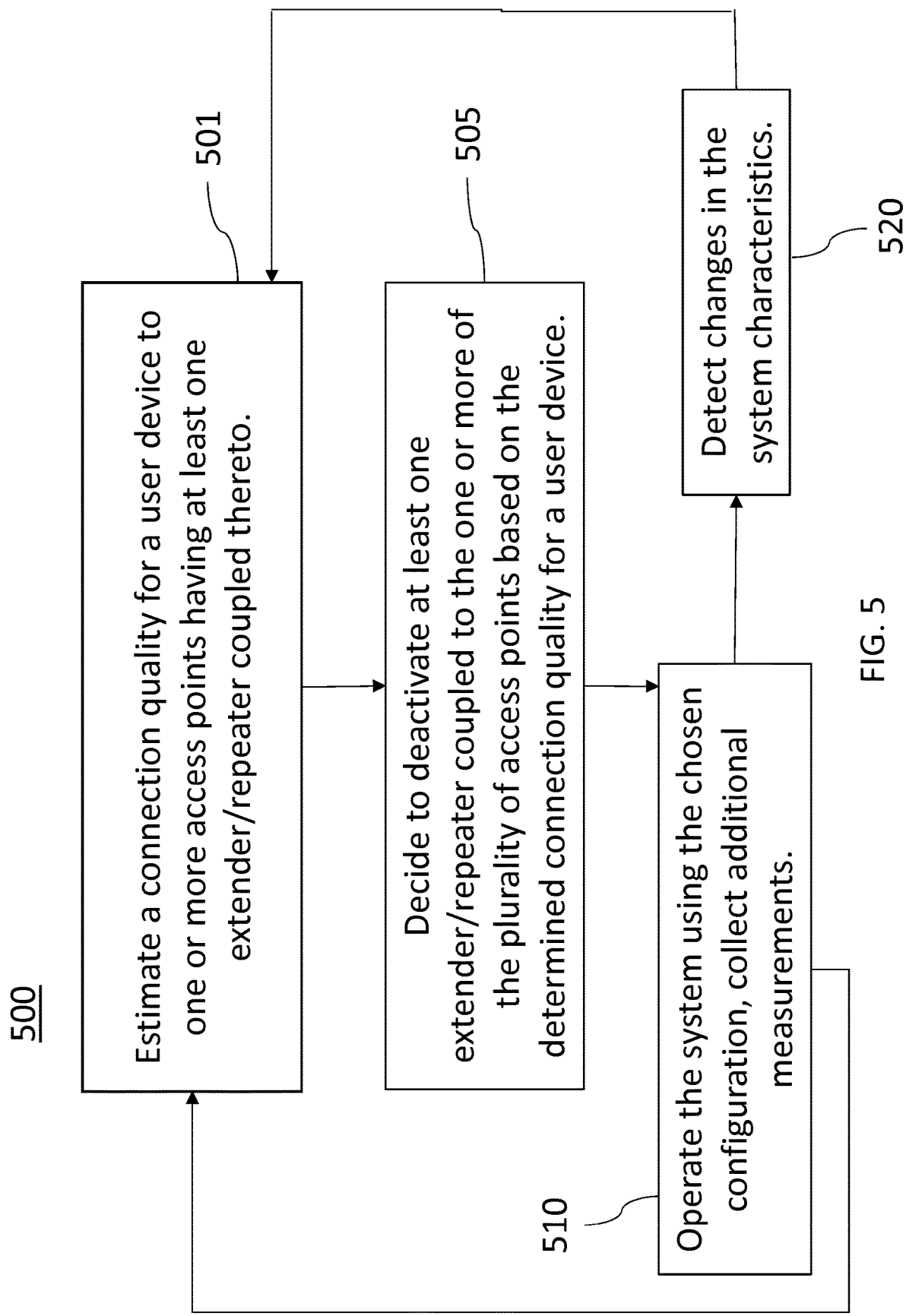
FIG. 5 illustrates a flowchart of an exemplary method in accordance with another embodiment of the disclosure.

Referring to step 401 of FIG. 4, the controller 120 will acquire information about the quality of the connection by observing the connection quality of each user device. It will exploit this information and gradually optimize the subset of access points and/or repeaters that may be activated for the user device to access the wireless system, as depicted in step 405. To perform this optimization of a chosen configuration via additional measurements as depicted in step 410, the controller will use a reinforcement algorithm, as they are suited to optimization under uncertainty and learning by experiment. More specifically, one exemplary embodiment includes a complex, combinatorial bandit algorithm. Referring to FIG. 5, we describe one such algorithm below for illustration, but other approaches are possible.

Algorithm illustration:

Define (estimate) a prior belief about the quality of each access point 105 and/or extender/repeater 110, 112, 114, 116 with respect to each user device 102, 103 (and an associated quality model), as depicted in step 501. This prior belief can take the form of a probability distribution $p_{\theta_{d,a}}^0$ on the parameter $\theta_{d,a}$ of the probability distribution $p_{Q(d,a)}(\cdot|\theta_{d,a})$ of an instantaneous connection quality $Q_t(d,a)$. As an example, $p_{\theta_{d,a}}^0$ can be a Normal-Inverse Gamma distribution and $p_{Q(d,a)}(\cdot|\theta_{d,a})$ a Normal distribution. Additionally, the prior belief about the quality of each access point 105 and/or extender/repeater 110, 112, 114, 116 may be configured (shaped) to obtain specific behaviors when the learning process begins. For example, the prior belief may be optimistic, which means it will overestimate the connection quality of each access point 105 and/or extender/repeater 110, 112, 114, 116, so that all access points and/or extender/repeaters are active to begin with and are gradually deactivated. As another example, the prior belief could be designed to mimic the expected connection quality of an access point and/or extender/repeater so that the behavior of the system converges faster to an optimal value. The prior beliefs can also be based on known information about the access point and/or extender/repeater brand or historic information about the access point and/or extender/repeater in the specific area.

The prior belief will typically but not necessarily belong to the family of conjugate prior beliefs.

The system then performs the following update for every time window:

Sample a value $\hat{\theta}_{d,a}^t$ for the parameters $\theta_{d,a}$ for each arm and device from the corresponding distributions $p_{\theta_{d,a}}^t$.

Decide which access point and/or extender/repeater for a user device to access the wireless system and change the activation status of (deactivate) at least one extender/repeater coupled to the one or more of the plurality of access points, as depicted in step 505 of FIG. 5. The access point and/or extender/repeater for the user device to access are selected by optimizing the expectation of the objective function $o_t(A)$ where the expectation is taken with respect to the parameters $\hat{\theta}_{d,a}^t$.

Depending on the form of this objective, the solution may not have an analytical expression. In that case one may instead optimize a lower or upper bound on the expression or use Monte Carlo sampling.

Apply the computed solution during the time window and observe the quality of the connection and of the access point and/or repeater for each device and collect additional measurements, as depicted if step 510 of FIG. 5. Several observations O are possible. The system 100 may observe which access point and/or repeater each user device connects to (and assume this is the best one). The system 100 may observe quality metrics for the time window for each device and the access point and/or repeater it connects to. The system may also measure some quality metrics for the access point and/or the extender/repeater and the user device that did not connect to each other, for example, using 802.11K Beacon Reports. The observations can be performed by the access point and/or extender/repeater or by the devices. In the latter case, the observation must be communicated to the system 100.

Update the beliefs about the quality of each access point and/or extender/repeater-user device pair. This can be done by applying Bayes rule to compute the posterior distributions from the previous one and the new observations:

$$p_{\theta_{d,a}}^{t+1} \propto p_{\theta_{d,a}}^t p_{Q(d,a)}(O|\theta_{d,a}).$$

Approximate inference such as particle filtering can be used if exact inference is not possible.

The algorithm described above optimizes the system while assuming that the distributions do not change abruptly or over time. This is unrealistic in the home network: devices will move, get switched on/off, interferences (for example from neighbors) will come and go. etc. There are at least three methods to handle such changes.

1. The first method includes "forgetting" the information acquired over time. In practice, this can be implemented by slightly modifying the parameters of the posterior distribution to bring them closer to the prior beliefs. Alternatively, only some parameters can be modified, for example by increasing the "variance" of the posterior distribution while keeping its mean unchanged.

2. The second method includes using a change detection algorithm in the system. Such an algorithm can, for example, use the distributions maintained by the combinatorial bandit algorithm to detect 'outliers' and, when too many outliers are detected, signal a change. The system can then be reinitialized for all or some user devices or access point and/or repeater, depending on the change.

3. The third method uses the user device. Internal sensors such as accelerometers can be used to detect changes in the device positions and signal the change to the system, as depicted in step 520 of FIG. 5.

Additionally, if there is no user device accessing the wireless system 100, some methods described above may not work. Solutions include: a specific button on some or all access points and/or extenders/repeaters to restart the system, periodic checks by the system, leaving at least some access points and/or extenders/repeaters on at all times to detect new devices (but potentially not providing them an optimal connection).

It should be understood, that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

Herein, the phrase "coupled" is defined to mean directly connected to, or indirectly connected with, through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventors to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagram presented herein represent conceptual views of illustrative circuitry embodying the principles of the disclosure. Similarly, it will be appreciated that any flow charts, flow diagrams, state transition diagrams, pseudocode and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims, hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The invention claimed is:

1. A method, comprising:
obtaining, a connection quality for a user device to one or more wireless access points having at least one device for extending wireless signal coverage coupled thereto, wherein the connection quality for the user device is based on a difference between a connection strength and an energy consumption for each of said at least one device for extending wireless signal coverage; and
changing an activation status of the at least one device for extending wireless signal coverage coupled to the one or more wireless access points based on the connection quality for the user device.

2. The method of claim 1, wherein the connection quality of the user device is determined based on one or more of signal to noise ratio, number of packets correctly transmitted, an inverse of a percentage of retransmissions, whether the user device could connect to one of the wireless access points and up or downstream debit.

3. The method of claim 1, wherein the connection quality of the user device is determined as a function of:

$$o_t(A) = \max_{A \subset S} \max_{a \in A} Q_t(d, a) - C|A|$$

wherein $Q_t(d,a)$ is a connection strength and $C|A|$ is an energy consumption for the at least one device for extending wireless signal coverage.

4. The method of claim 1, wherein the one or more wireless access points are one of a WLAN or a WiFi network.

5. A system, comprising:
one or more wireless access points having at least one device for extending wireless signal coverage coupled thereto; and
a controller including one or more processors configured to change an activation status of the at least one device for extending wireless signal coverage coupled to said one or more wireless access points based on connection quality of a user device, wherein said connection quality of the user device is based on a difference between a connection strength and an energy consumption for each of said at least one device for extending wireless signal coverage.

6. The system of claim 5, wherein the one or more processors are configured to obtain the connection quality of the user device based on one or more of signal to noise ratio, number of packets correctly transmitted, an inverse of a percentage of retransmissions, whether the user device could connect to one of the access points and up or downstream debit.

7. The system of claim 5, wherein the one or more processors are configured to determine the connection quality of the user device as a function of:

$$o_t(A) = \max_{A \subset S} \max_{a \in A} Q_t(d, a) - C|A|$$

wherein $Q_t(d,a)$ is a connection strength and $C|A|$ is an energy consumption for the at least one device for extending wireless signal coverage.

8. The system of claim 5, wherein the one or more wireless access points are one of a WLAN or a WiFi network.

9. The system of claim 5, further comprising a user device for coupling to the one or more wireless access point.

10. A non-transitory computer-readable medium for a programmable apparatus, comprising a sequence of instructions for implementing a method according to claim 1, when loaded into and executed by the programmable apparatus.

* * * * *